Aug. 31, 1926.
F. BEVERLY
1,598,114
AUTOMOBILE POWER TAKE-OFF DEVICE
Filed Oct. 16, 1925
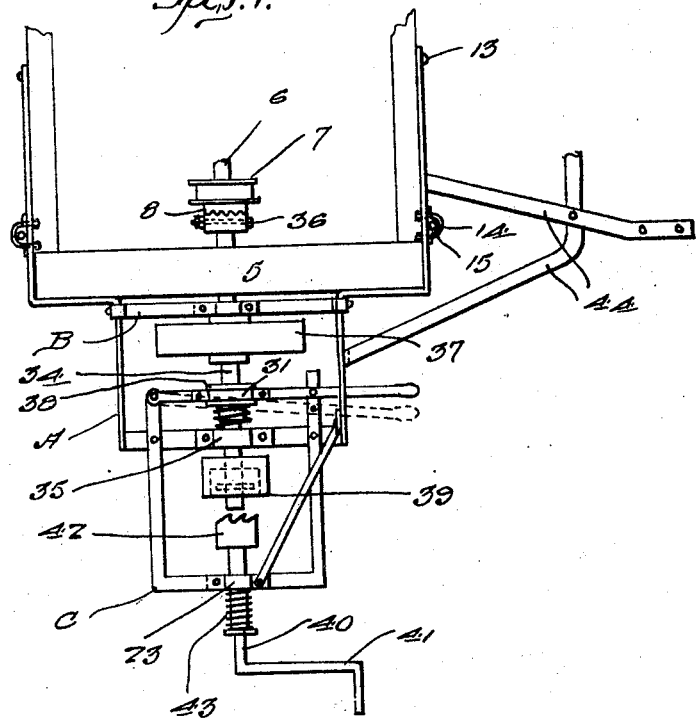
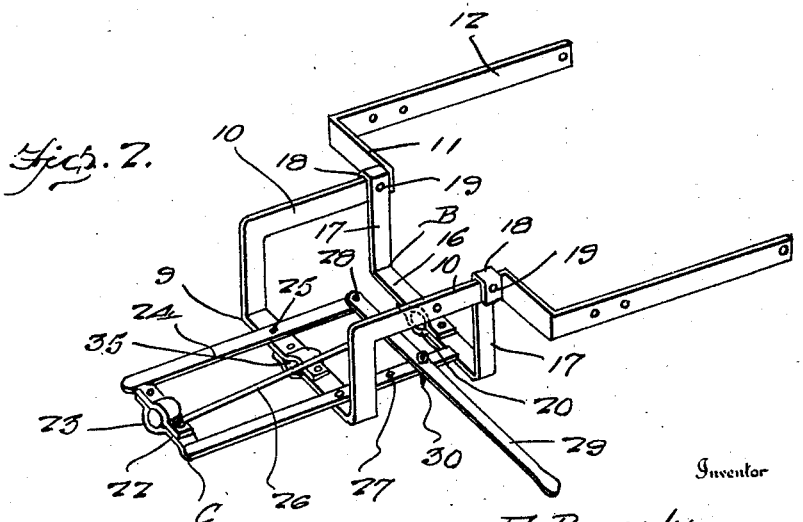
Inventor
F. Beverly
By Clarence A. O'Brien
Attorney Patented Aug. 31, 1926.

1,598,114

UNITED STATES PATENT OFFICE.

FRANK BEVERLY, OF KILLEEN, TEXAS.

AUTOMOBILE POWER-TAKE-OFF DEVICE.

Application filed October 16, 1925. Serial No. 62,786.

The present invention appertains to improvements in power take off devices such as are used in connection with automobiles for driving power operated saws such as are shown in my application bearing Serial No. 7585, filed February 7, 1925.

The principal object of the invention is to provide a sturdy structure of this nature which possesses superior compactness and convenience, a structure which is exceedingly simple, inexpensive to manufacture, efficient and reliable in use, easy to assemble in relation to the automobile chassis, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of the mechanism embodying the features of my invention showing the same attached to the forward end of an automobile chassis, Figure 2 is a perspective view of the frame structure thereof.

Referring to the drawing in detail it will be seen that 5 designates the chassis of an automobile, 6 the crank shaft of said automobile, 7 the fan pulley thereof, and 8 a clutch segment on said shaft 6. The stationary parts of my device include the main frame A, the bracket B, and the auxiliary frame C.

Referring in detail to the main frame A it will be seen that the numeral 9 designates the vertical intermediate U-shaped portion, the ends of which merge into rearwardly extending arms 10. These arms 10 merge into outwardly extending lateral extensions 11, which in turn merge into rearwardly extending members 12, adapted to lie alongside of the forward portions of the sides of the chassis 5, and to be held in engagement therewith by the bolts 13, and U-bolts 14, which also hold the lamp brackets 15 in place. The bracket B is of U-shaped formation and is disposed in a vertical plane parallel to the vertical plane of the U portion 9. This bracket B includes the intermediate portion 16, the legs or sides 17 and the hook terminals 18 engaged over the rear ends of the arms 10 and fixed thereto by rivets 19 or in any other suitable manner. The intermediate portion 16 is provided with a central bearing 20.

Referring particularly to the auxiliary frame C it will be seen that numeral 22 represents the intermediate forward portion thereof having a central bearing 23. The legs 24 extend rearwardly from the intermediate portion 22 and have intermediate points thereof resting on and fixed to the mid portion of the U-shapd portion 9 as is indicated at 25. This auxiliary frame C is, therefore, U-shaped in formation and lies in a horizontal plane. A brace 26 is attached at one end to the intermediate portion 22 and at its other end to the juncture of one side of the U-shaped portion with the adjacent arm 10. One leg 24 is provided with a pair of spaced apertures 27 between the U-shaped portion 9 and the U-shaped bracket B. The terminal of the other leg 24 is disposed forwardly of the bracket B and has pivoted thereto as at 28 a lever 29 provided with an aperture for receiving a pin 30 which is adapted to extend through either of the apertures 27 for holding this lever in different adjusted positions. The lever is provided with a yoke portion 31 between the legs 24 and aligned with the bearings 20 and 23.

The main shaft 34 of the mechanism is slidable and rotatable in bearings 20 and 35, the latter of which is disposed in the mid portion of the U-shaped portion 9. A clutch segment 36 is fixed on the rear end of this main shaft 34 for engagement with the clutch segment 8. A pulley 37 is mounted on the shaft 34 adjacent the bracket B. A grooved collar 38 is fixed to the shaft 34 for engagement by the yoke 31. A combination pulley and clutch segment 39 is mounted on the forward end of the shaft 34. The shaft 40 of the starting crank 41 is slidable and rotatable in the bearing 23. The clutch segment 42 on the rear end of the shaft 40 is engageable with the clutch segment 39 but is normally held out of engagement therewith by a spring 43. The members indicated by the numerals 44, represent parts for supporting a power operated saw to the side of the chassis 5, such as is shown in my pending application referred to above in order that the same may be driven from this improved power take off device.

Particular attention is directed to the superior compactness and convenience afforded by the combination and arrangement of parts described above, and also to the fact that the resultant structure possesses great strength, lightness and durability. Furthermore, the structure is thoroughly efficient and reliable and is capable of ready attachment to the chassis to form a compact and convenient assembly unit therewith. The present embodiment of the invention has been disclosed in detail since in actual practice it attains the features of advantage enumerated as desirable in the statement of the invention and the above description.

It will be apparent that numerous changes in the details of construction may be resorted to without departing from the spirit or scope of the invention as hereinafter claimed or sacrificing any of its advantages.

Having thus described my invention, what I claim as new is:

1. In a power take off device, a supporting frame formed with an intermediately located vertical U-shaped portion, a pair of arms extending rearwardly from the terminals of the U-shaped portion, outwardly extending lateral extensions merging from the arms and rearwardly extending members merging from the extensions and adapted to be secured to the forward portions of the sides of a chassis, a vertical U-shaped bracket having hooked terminals engaged with rear ends of the arms and formed with a central bearing, a horizontal auxiliary U-shaped frame having its sides extending rearwardly with mid points thereof secured to the mid portion of the vertical U-shaped portion of the main frame which is provided with a bearing, one end of the auxiliary frame terminating between said vertical U-shaped portion, and said vertical U-shaped bracket, a lever pivoted to said end of the auxiliary frame, means associated with the lever and the other end of the auxiliary frame for holding said lever in different adjusted positions, a yoke formed intermediately of said lever, a shaft slidable and rotatable in the bearing of the U-shaped bracket and the bearing of the vertical U-shaped portion, a grooved collar fixed to said shaft and operatively connected with the yoke of the lever.

2. In a power take off device, a supporting frame formed with an intermediately located vertical U-shaped portion, a pair of arms extending rearwardly from the terminals of the U-shaped portion, outwardly extending lateral extensions merging from the arms and rearwardly extending members merging from the extensions and adapted to be secured to the forward portions of the sides of a chassis, a vertical U-shaped bracket having hooked terminals engaging with rear ends of the arms and formed with a central bearing, a horizontal auxiliary U-shaped frame having its sides extending rearwardly with mid points thereof secured to the mid portion of the vertical U-shaped portion of the main frame which is provided with a bearing, one end of the auxiliary frame terminating between said vertical U-shaped portion, and said vertical U-shaped bracket, a lever pivoted to said end of the auxiliary frame, means associated with the lever and the other end of the auxiliary frame for holding said lever in different adjusted positions, a yoke formed intermediately of the lever, a shaft slidable and rotatable in the bearing of the U-shaped bracket and the bearing of the vertical U-shaped portion, a grooved collar fixed to said shaft and operatively connected with the yoke of the lever, and a brace extending between the juncture of one terminal of the vertical U-shaped portion with one arm and the intermediate portion of the horizontal auxiliary U-shaped frame.

In testimony whereof I affix my signature.

FRANK BEVERLY.